US005696488A

United States Patent [19]

Assisi

[11] Patent Number: 5,696,488

[45] Date of Patent: Dec. 9, 1997

[54] DEVICE FOR STORAGE AND RETRIEVAL OF PERSONAL INFORMATION

[76] Inventor: Ramin Assisi, Burkheimer Strasse 3, 7911 Freiburg, Germany

[21] Appl. No.: 496,721

[22] Filed: Jun. 29, 1995

[51] Int. Cl.[6] .............................. G08B 1/08; H04Q 7/00

[52] U.S. Cl. .............. 340/539; 340/825.54; 340/825.15; 340/825.27; 235/375

[58] Field of Search .............................. 340/539, 825.54, 340/825.15, 825.27; 235/375, 383, 385

[56] References Cited

U.S. PATENT DOCUMENTS

| | | | |
|---|---|---|---|
| 4,473,824 | 9/1984 | Claytor | 340/825.27 |
| 5,038,284 | 8/1991 | Kramer | 340/825.27 |
| 5,335,276 | 8/1994 | Thompson et al. | 380/21 |
| 5,398,021 | 3/1995 | Moore | 340/825.27 |
| 5,426,422 | 6/1995 | Vanden Heuvel et al. | 340/825.26 |

*Primary Examiner*—Donnie L. Crosland
*Attorney, Agent, or Firm*—Weintraub DuRoss & Brady

[57] ABSTRACT

A device for storage retrieval of personal information relating to a deceased person is so designed that a cemetery contains an electronic storage device with the personal information, and in that a transmitter/receiver device connected to the storage device is disposed in a recess in the gravestone of the deceased person, by means of which the information stored in the storage device may be called up. For this purpose the transmitter/receiver device may be designed for "wireless" communication with a portable communications apparatus. The communications apparatus includes a memory for recording information called up from the storage device.

9 Claims, 1 Drawing Sheet

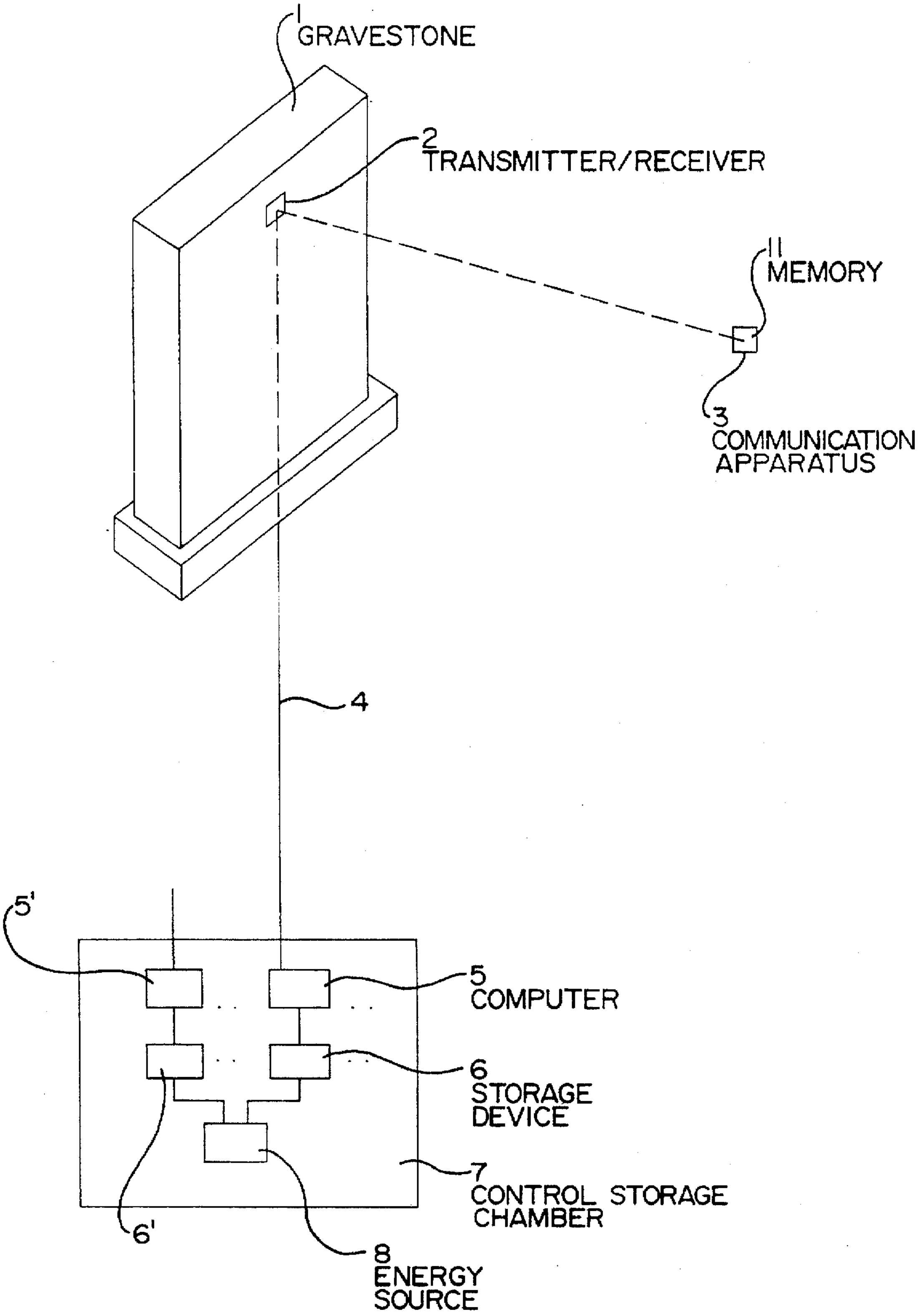
1
GRAVESTONE
2
TRANSMITTER/RECEIVER
11
MEMORY
3
COMMUNICATION
APPARATUS
4
5'
5
COMPUTER
6
STORAGE
DEVICE
7
CONTROL STORAGE
CHAMBER
6'
8
ENERGY
SOURCE

DEVICE FOR STORAGE AND RETRIEVAL OF PERSONAL INFORMATION

The invention relates to a device for storage and retrieval of personal information relating to and/or from a deceased person.

The estate in media form of deceased persons, for example in the form of written records, audio and video recordings is normally present in a physical form and is managed by the heirs, foundations or other institutions. The deceased person normally has little influence on the nature of this management. A drawback is also seen to reside in the fact that this information normally exists in analog form and therefore is not directly processable in terms of information technology. In addition, a search for specific information can be a lengthy and expensive process.

It is therefore the purpose of the present invention to provide a device for storage and retrieval of personal information relating to and/or from a deceased person, which enables said deceased person during his or her lifetime to determine the content of this information, to render said information accessible after death to a selected circle of persons, and to subject this access to specific limitations; furthermore, the information should be available for direct processing in information technology terms, and desired information should be easy to find.

This purpose is fulfilled according to the invention by the features indicated in the characterizing part of Claim 1. Advantageous further developments of the device according to the invention will become apparent from the secondary claims.

By virtue of the fact that a cemetery contains an electronic storage device with the personal information, or is connected to such a storage device, and in that there is provided a transmitter/receiver device in the cemetery, connected to said storage device, via which information stored in the storage device may be called up, any person with suitable recording apparatus can gain access to the storage device and may call up therefrom desired information for display or direct processing. Due to the electronic storage of the information in digital form, this information is protected from loss for a long period (basically for any length of time).

The information may be entered by means of known measures into the storage device during the lifetime of the deceased person. Therefore the person himself or herself can determine which information shall form his/her intellectual estate. This information may be in the form of text, image or audio data in any combination.

Input of the data may be undertaken at a suitable place, the storage device itself likewise being capable of being located at this place or already at its final place of storage. If necessary, the information may be initially stored intermediately in a mobile recording medium.

The storage device advantageously has a data bank structure, so that a search for specific information may be simply carried out. Communication with the storage device is appropriately carried out via a portable communications apparatus, which is brought into the vicinity of the transmitter/receiver device and communicates therewith in a "wireless" manner by means of electromagnetic waves. The communications device includes a recording medium for intermediate storage of the information called up from the storage device. This information may, for example, be displayed and/or printed out, or made audible as sound at home by means of appropriate devices.

A computer is preferably provided for control of communication between the communications device and the transmitter/receive device or the storage device. This enables communication in dialogue form, the type of dialogue being determined by the person using the communications apparatus by posing corresponding questions, or by means of the program stored in the computer. This program may also include restrictions relating to access to the storage devices, for example, with respect to the circle of users or the time of release of all or specific pieces of information.

The invention will be explained in more detail in the following with reference to an embodiment given by way of example and illustrated in the FIGURE. This shows diagrammatically a device for storage and retrieval of personal information relating to and/or from a deceased person.

A gravestone 1 erected on the grave of the deceased person carries a transmitter/receiver device 2, which can communicate with a small communications apparatus 3 unobtrusively carried by a visitor to the grave.

The transmitter/receiver device 2 is connected by a data cable 4 to a computer 5 and to a storage device 6, which contains personal information on the deceased person. The computer 5 and the storage device 6 may be located directly in the cemetery or, as is shown in the FIGURE, in a central storage chamber 7, which also includes further computers 5' and storage devices 6'. These are connected to a common energy source 8.

An authorized visitor to the grave can bring the communications apparatus 3 into the vicinity of the transmitter/receiver device 2 in such a way that "wireless" communication between these is possible. The communications apparatus 3 can carry out a dialogue with the computer 5 and call up information in its own memory 11. This procedure may be effected unobtrusively, so that the dignity of the location is not disturbed.

The information stored in the communications apparatus 3 may be later reproduced audibly by persons or, as it exists in digital form, may be directly processed.

I claim:

1. A system for storage and retrieval of personal information relating to a deceased person, the system comprising:

(a) a gravestone;

(b) at least one electronic storage unit for storage of personal information of a deceased person; and (c) a transmitter/receiver unit, the transmitter/receiver unit disposed on the gravestone and in electronic communication with the at least one storage unit.

2. The system of claim 1, further comprising at least one portable communications unit, the at least one portable communications unit comprising a memory, the at least one portable communications unit in electronic communication with the transmitter/receiver unit.

3. The system of claim 2, further comprising: a computer for controlling communication between the at least one portable communications unit, the transmitter/receiver unit, and the storage unit.

4. The system of claim 1, wherein the electronic communication is a dialogue communication.

5. The system of claim 1, wherein the storage unit has the structure of a data bank.

6. The system of claim 1, wherein the information stored in the storage unit comprises image, text and/or audio data.

7. The system of claim 3, wherein the computer includes access restrictions.

8. The system of claim 1, further comprising a plurality of storage units and a central storage unit repository wherein the plurality of storage units are located in the central storage unit repository.

9. The system of claim 1, further comprising an energy source for the storage device.

* * * * *